3,264,340
PROCESS FOR PREPARING COMPOUNDS CONTAINING AN ETHIONYLAMINO GROUP
Rudolf Kühne and Fritz Meininger, Frankfurt am Main, Germany, assignors to Farbwerke Hoechst Aktiengesellschaft vormals Meister Lucius & Bruning, Frankfurt am Main, Germany, a corporation of Germany
No Drawing. Filed May 3, 1962, Ser. No. 192,069
Claims priority, application Germany, May 6, 1961, F 33,864
4 Claims. (Cl. 260—458)

This invention provides a process for preparing compounds containing an ethionylamino group or an N-alkyl- or N-phenyl-ethionylamino group which in the form of their free acids correspond to the formula

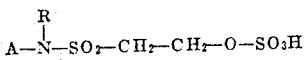

in which A stands for a substituted or unsubstituted aromatic radical and R for a hydrogen atom, a phenyl group or an alkyl group having 1 to 4 carbon atoms.

Ethionyl compounds of particular interest are those described by the formula

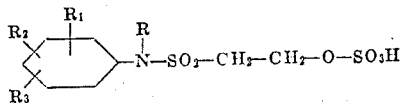

wherein R is a member selected from the group consisting of hydrogen, phenyl, and lower alkyl, $R_1$ is a member selected from the group consisting of hydrogen, chlorine, nitro, hydroxy, di-(lower alkyl)-amino, phenyl azo, benzoyl, phenoxy, lower alkyl, and lower alkoxy, $R_2$ is a member selected from the group consisting of hydrogen, chlorine, nitro, lower alkyl, and lower alkoxy, $R_3$ is a member selected from the group consisting of hydrogen and nitro, and, when $R_1$ is hydrogen, $R_2$ and $R_3$ taken with the phenyl radical of the formula may be naphthyl.

We have found that the compounds containing an ethionylamino group or an N-alkyl- or N-phenyl-ethionyl-amino group can be prepared by reacting carbyl sulfate with a primary or secondary aromatic amine in nitrobenzene as reaction medium, mixing thoroughly the reaction mixture with water, neutralizing the aqueous phase by simultaneously adding an alkali-binding agent, separating the aqueous extract from the nitrobenzene phase and recovering the resultant compound from the aqueous phase. This result is surprising in so far as the ethionyl-amino group is not hydrolyzed by the action of water and alkali-binding agent.

By compounds containing an ethionylamino group or an N-alkyl- or N-phenyl-ethionylamino group, there are to be understood those which in the form of the free acids correspond to the formula

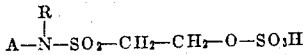

in which A stands for a substituted or unsubstituted aromatic radical and R represents a hydrogen atom, a phenyl group or an alkyl group having 1 to 4 carbon atoms. The aromatic radical can belong to the benzene, naphthalene, diphenyl, diphenyl ether, diphenyl thioether, diphenylmethane, benzophenone, diphenylamine, diphenylsulfone, azobenzene or stilbene series and may contain any substituent such as halogen atoms, alkyl, hydroxy, alkoxy, nitro or carboxylic acid groups.

In carrying out the process of the present invention such aromatic amines are preferred which are slightly soluble or insoluble in water. As primary or secondary aromatic amines serving as starting material there may be mentioned, for example, 1-aminobenzene, 1-methylamino-benzene, 4-nitro-1-aminobenzene, 4-nitro-1-methylamino-benzene, 4-nitro-1-butylaminobenzene, halogen-amino-benzenes such as 3-chloro-1-aminobenzene and 4-bromo-1-aminobenzene or halogen-nitro-aminobenzenes such as 3-chloro-4-nitro-1-aminobenzene and 4-chloro-3-nitro-1-aminobenzene, furthermore toluidines, nitrotoluidines, aminophenols, aminophenol ethers or nitro-aminophenols such as 2-nitro-4-methyl-aminophenol. Furthermore, there may be used for the process of the present invention the amino or N-monoalkylamino derivatives of diphenylamine, diphenyl, diphenyl ether, diphenyl thioether, diphenylsulfone, stilbene, azobenzene, diphenylmethane, benzophenone and naphthalene which may contain any substituent named above.

For carrying out the process the primary or secondary aromatic amines are dissolved or suspended in nitrobenzene and mixed with pulverized carbyl sulfate or a solution of carbyl sulfate in nitrobenzene, while vigorously stirring and heating the mixture to a temperature between 0° and 100° C., preferably between 20° and 80° C. The reaction products are recovered by thoroughly mixing the reaction mixture with water at room temperature, neutralizing the aqueous phase by simultaneously adding an acid-binding agent and separating the aqueous extract, preferably at elevated temperature from the nitro-benzene phase. If necessary, these steps are repeated in order to extract the remainder of the reaction product from the nitrobenzene phase. The compounds obtainable by the present invention are then isolated from the combined aqueous extracts, for example by salting out the resultant compound with an alkali chloride. After filtration the compounds are dried at low temperature.

As acid-binding agents, there may be used alkali metal or alkaline earth metal hydroxides, borates and phosphates, more particularly alkali metal or alkaline earth metal carbonates or hydrogen carbonates, such as potassium hydrogen carbonate, sodium carbonate or calcium carbonate.

The compounds obtainable by the process of the present invention are valuable intermediates for the production of medicaments, textile auxiliaries, pesticides and dyestuffs. For example, the nitro-substituted ethionyl-aminobenzenes obtainable by the present invention may be applied to cotton on which they may be fixed and reduced to the corresponding amino derivatives by treating them with sodium hydrosulfite in the presence of an alkaline substance. When the amino compounds are diazotized on the fibre and coupled with coupling components, there are obtained uniform dyeings having very good fastness properties.

The following examples serve to illustrate the invention but they are not intended to limit it thereto, the parts being by weight unless otherwise stated and the relationship of parts by weight to parts by volume being the same as that of the kilogram to the liter.

*Example 1*

380 parts of 4-nitro-1-N-methylamino-benzene are dissolved while heating in 1500 parts of nitrobenzene free from water. Into this solution 235 parts of crude carbyl sulfate (content of pure substance about 80%) are introduced, the batch is liquefied by heating to a temperature between 70° C. and 80° C. which temperature is maintained for about 2 hours. After cooling the viscous mass is repeatedly stirred with 3000 parts by volume of water and neutralized by simultaneously strewing in sodium hydrogen carbonate. The neutral extracts separated from the nitrobenzene phase at 80° to 90° C. are combined and stirred for 15 minutes at 60° to 70° C. with 10 parts each of kieselguhr and charcoal. After filtering and cooling the product is salted out from the solution obtained by adding potassium chloride and separated by filtration. After dissolving in water and recrystallizing 358 parts of pure potassium salt of the 4-nitro-1-N-methyl-N-ethionylaminobenzene are obtained. The product melts at 224° to 226° C. under decomposition.

$C_8H_{11}O_8N_2S_2K$.—Calculated: N, 7.4; S, 16.9. Found: N, 7.3; S, 16.8.

Example 2

172.5 parts of 4-chloro-3-nitro-1-aminobenzene are introduced into 850 parts of nitrobenzene free from water and 117.5 parts of crude carbyl sulfate (content of pure substance about 80%) are added within 30 minutes. The mixture is heated to a temperature between 70° and 75° C. which temperature is maintained for 2 hours. After cooling the mixture is repeatedly treated with water and neutralized by simultaneously adding solid sodium carbonate. The neutral aqueous extracts are separated at 90° C. from the nitrobenzene phase, combined and freed from traces of nitrobenzene by vacuum distillation at 50° C. After cooling the compound is salted out by adding potassium chloride, filtered off and dried. After dissolving in water and recrystallizing the potassium salt of the 4-chloro-3-nitro-1-N-ethionylaminobenzene is obtained in a very good yield in the form of weakly yellow needles melting at 256° to 257° C. under decomposition.

$C_8H_8O_8N_2S_2ClK$.—Calculated: C, 24.1; H, 2.0; N, 7.0. Found: C, 24.3; H, 2.0; N, 7.1.

Instead of sodium carbonate there may also be used for the neutralization magnesium oxide or lithium carbonate.

Example 3

From 49.5 parts of 2-nitro-5-aminohydroquinone dimethyl ether, 23.5 parts of crude carbyl sulfate (content of pure substance about 80%) and 150 parts of nitrobenzene free from water there are obtained according to the process described in Example 1 38.2 parts of pure potassium salt of 2-nitro-5-N-ethionylamino-hydroquinone dimethyl ether. The compound melts at 152° to 153° C. under decomposition.

$C_{10}H_{13}O_{10}N_2S_2K$.—Calculated: C, 28.3; H, 3.1; N, 6.6. Found: C, 28.2; H, 3.3; N, 6.3.

Example 4

39.4 parts of 4-amino-1,1'-azobenzene are introduced into 150 parts of nitrobenzene free from water. Into this mixture 37.6 parts of carbyl sulfate dissolved in 120 parts of nitrobenzene are added dropwise within one hour at 25° to 30° C. After stirring the mixture for 15 hours at about 30° C. water is added. The nitrobenzene-water emulsion obtained is neutralized by the addition of an aqueous potassium hydrogen carbonate solution and, subsequently, heated to 80° C. At this temperature the aqueous phase is separated, treated with charcoal, filtered and the compound is precipitated from the filtrate by introducing potassium chloride. After dissolving in water and recrystallizing orange yellow crystals charing at 231° C. are obtained.

$C_{14}H_{14}O_6N_3S_2K$.—Calculated: C, 39.7; H, 3.3; S, 15.1. Found: C, 40.2; H, 3.5; S, 15.0.

Example 5

425 parts of 3-chloro-4-nitro-1-aminobenzene are introduced into 1440 parts of nitrobenzene free from water and 235 parts of crude carbyl sulfate (content of pure substance about 80%) are added to 20° to 30° C. The mixture is maintained at this temperature for 5 hours and, subsequently, liquefied by heating to 75° to 80° C. After cooling the mixture is introduced while stirring into 3000 parts of water, neutralized by adding sodium carbonate and freed from the nitrobenzene phase at 80° C. The treatment of the nitrobenzene phase with water and sodium carbonate is repeated until the water-soluble compound is completely extracted. The neutral aqueous extracts are combined, treated at 60° C. with kieselguhr and charcoal, filtered and the compound is salted out by adding potassium chloride. The crystal slurry obtained is filtered, washed with a potassium chloride solution and dried in vacuo at 60° C. 416 parts of a weakly yellow powder containing 352 parts of the potassium salt of 3-chloro-4-nitro-1-N-ethionylaminobenzene are obtained. The compound is dissolved in water and recrystallized in the form of long needles melting at 219° to 221° C.

$C_8H_8O_8N_2S_2ClK$.—Calculated: C, 24.1; H, 2.0; Cl, 8.9. Found: C, 24.0; H, 2.2; Cl, 9.0.

The following table describes further compounds containing an ethionylamino group an N-alkyl- or N-phenyl-ethionylamino group which compounds have been prepared and isolated according to the process described in Example 1 with the use of primary or secondary aromatic amines. The yields obtained are good to very good.

| Example | Aromatic Amine | Product | Melting Point |
| --- | --- | --- | --- |
| 6 | 3-nitro-1-aminobenzene | 3-nitro-1-N-ethionylaminobenzene, potassium salt. | 220° to 221° C. under decomposition. |
| 7 | 3-nitro-1-methylaminobenzene. | 3-nitro-1-N-methyl-N-ethionyl-amino-benzene, potassium salt. | 228° to 229° C. under decomposition. |
| 8 | 4-nitro-1-ethylaminobenzene. | 4-nitro-1-N-ethyl-N-ethionyl-amino-benzene, potassium salt. | 182° to 184° C. |
| 9 | 1-methylamino-benzene. | 1-N-methyl-N-ethionylamino-benzene, potassium salt. | 177° to 178° C. |
| 10 | 4-nitro-1-butylamino-benzene. | 4-nitro-1-N-butyl-N-ethionyl-amino-benzene, potassium salt. | 172° to 173° C. |
| 11 | 2,5-dimethyl-4-nitro-1-methylamino-benzene. | 2,5-dimethyl-4-nitro-1-N-methyl-N-ethionylaminobenzene, potassium salt. | 237° C. under decomposition. |
| 12 | 3-nitro-4-ethoxy-1-aminobenzene. | 3-nitro-4-ethoxy-1-N-ethionyl-amino-benzene, potassium salt | 208° to 209° C. |
| 13 | 5-nitro-2,4-dimethoxy-1-aminobenzene. | 5-nitro-2,4-dimethoxy-1-N-ethionylamino-benzene, potassium salt. | 194° to 195° C. |
| 14 | 2-nitro-4-methylamino-phenol. | 2-nitro-4-N-methyl-N-ethionyl-amino-phenol, monopotassium salt. | 236° C. under decomposition. |
| 15 | 4-N-methylamino-phenol. | 4-N-methyl-N-ethionylamino-phenol, monopotassium salt. | 217° to 218° C. |
| 16 | 2-N-methylamino-naphthalene. | 2-N-methyl-N-ethionylamino-naphthalene, potassium salt. | 212° to 214° C. under decomposition. |
| 17 | Diphenylamine | 1-N-phenyl-N-ethionylamino-benzene, potassium salt. | 208° C. under decomposition. |
| 18 | 3-diethylamino-1-aminobenzene. | 3-diethylamino-1-N-ethionyl-aminobenzene, potassium salt. | 186° to 188° C. under decomposition. |
| 19 | 4-amino-benzophenone | 4-N-ethionylamino-benzophenone, sodium salt. | |
| 20 | 4-amino-diphenyl ether. | 4-N-ethionylamino-diphenyl-ether, potassium salt. | 211° to 213° C. |

We claim:
1. A process for preparing ethionylamino compounds corresponding in the form of their free acids with the formula

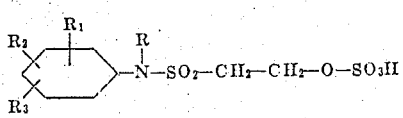

wherein R is a member selected from the group consisting of hydrogen, phenyl, and lower alkyl, $R_1$ is a member selected from the group consisting of hydrogen, chlorine, nitro, hydroxy, di-(lower alkyl)-amino, phenyl azo, benzoyl, phenoxy, lower alkyl, and lower alkoxy, $R_2$ is a member selected from the group consisting of hydrogen, chlorine, nitro, lower alkyl, and lower alkoxy, $R_3$ is a member selected from the group consisting of hydrogen and nitro, and, when $R_1$ is hydrogen, $R_2$ and $R_3$ taken with the phenyl radical of the formula may be naphthyl, which process comprises reacting carbyl sulfate in nitrobenzene with an amine of the formula

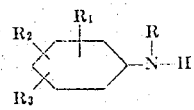

wherein R, $R_1$, $R_2$, and $R_3$ have the meanings given above, at a temperature between 0° and 100° C., mixing the resultant reaction mixture at room temperature with water while neutralizing the aqueous phase by adding an acid binding agent selected from the group consisting of sodium carbonate, potassium carbonate, sodium hydrogen carbonate, potassium hydrogen carbonate, lithium carbonate, and magnesium oxide, whereby the corresponding metal salts of said ethionylamino compounds are formed in the aqueous phase, separating the aqueous phase from the nitrobenzene phase, and salting out the ethionylamino compound from the aqueous phase.

2. A process as claimed in claim 1, wherein the reaction in nitrobenzene is carried out at a temperature ranging from 20° to 80° C.

3. The process for preparing the potassium salt of 4-nitro-1-N-methyl-N-ethionyl-amino-benzene, which comprises reacting carbyl sulfate in nitrobenzene with 4-nitro-1-N-methyl-amino-benzene at a temperature between 0° and 100° C., mixing the reaction mixture with water while neutralizing the aqueous phase by adding sodium hydrogen carbonate as acid-binding agent, separating the aqueous phase from the nitrobenzene phase, and salting out the ethionylamino compound from the aqueous phase by means of potassium chloride.

4. The process for preparing the potassium salt of 2-nitro - 5 - N-ethionylamino-hydroquinone-dimethyl-ether, which comprises reacting carbyl sulfate in nitrobenzene with 2-nitro-5-amino-hydroquinone - dimethyl - ether at a temperature between 0° and 100° C., mixing the reaction mixture with water while neutralizing the aqueous phase by adding sodium hydrogen carbonate as acid-binding agent, separating the aqueous phase from the nitrobenzene phase, and salting out the ethionylamino compound from the aqueous phase by means of potassium chloride.

References Cited by the Examiner

UNITED STATES PATENTS

| 2,666,788 | 1/1954 | Ebel | 260—458 XR |
| 2,682,509 | 6/1954 | Ross | 260—459 XR |
| 3,163,667 | 12/1964 | Klass et al. | 260—458 |

FOREIGN PATENTS 507,339  6/1939  Great Britain.

CHARLES B. PARKER, *Primary Examiner.*

JOSEPH P. BRUST, *Examiner.*

FLOYD D. HIGEL, *Assistant Examiner.*